(12) United States Patent
Vingralek

(10) Patent No.: US 8,291,260 B2
(45) Date of Patent: *Oct. 16, 2012

(54) ESTIMATING DATA AVAILABILITY ON MANAGED STORAGE DEVICES

(75) Inventor: Radek Vingralek, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,625

(22) Filed: Jan. 4, 2010

(65) Prior Publication Data

US 2010/0100765 A1    Apr. 22, 2010

Related U.S. Application Data

(63) Continuation of application No. 11/516,299, filed on Sep. 5, 2006, now Pat. No. 7,669,076.

(60) Provisional application No. 60/810,076, filed on May 30, 2006, provisional application No. 60/810,075, filed on May 30, 2006.

(51) Int. Cl.
*G06F 11/00* (2006.01)

(52) U.S. Cl. ........................................ 714/6.2

(58) Field of Classification Search ................ 714/6, 47, 714/6.1, 6.2, 47.1, 47.2, 47.3
See application file for complete search history.

(56) References Cited

U.S. PATENT DOCUMENTS

| | | | |
|---|---|---|---|
| 5,720,025 A * | 2/1998 | Wilkes et al. | 714/6 |
| 6,684,349 B2 * | 1/2004 | Gullo et al. | 714/47.2 |
| 6,895,533 B2 * | 5/2005 | Gray et al. | 714/47.3 |
| 7,020,599 B1 * | 3/2006 | Cao et al. | 703/22 |
| 7,596,727 B2 * | 9/2009 | Kuo | 714/47.1 |
| 2002/0124139 A1 * | 9/2002 | Baek et al. | 711/114 |
| 2006/0271547 A1 * | 11/2006 | Chen et al. | 707/10 |
| 2007/0195691 A1 * | 8/2007 | Volkerink et al. | 370/216 |

* cited by examiner

*Primary Examiner* — Scott Baderman
*Assistant Examiner* — Yair Leibovich
(74) *Attorney, Agent, or Firm* — Kilpatrick Townsend & Stockton LLP

(57) ABSTRACT

This disclosure describes methods, systems and software that can be used to calculate the estimated mean time to data loss for a particular configuration of a disk group. For example, a system can be used to evaluate a plurality of configurations, and/or to select (and/or allow a user to select) an optimal configuration of the disk group, based, in some cases, on the relative estimated mean times to data loss of the various configurations. This can allow, if desired, the configuration of the disk group to minimize the likelihood of data loss in the disk group.

20 Claims, 5 Drawing Sheets

ESTIMATING DATA AVAILABILITY ON MANAGED STORAGE DEVICES

CROSS-REFERENCE TO RELATED APPLICATIONS

The present disclosure may be related to the following commonly assigned applications/patents:

This application is a continuation of U.S. patent application Ser. No. 11/516,299, filed Sep. 5, 2006 by Vingralek and entitled "Estimating Data Availability on Managed Storage Devices, which claims the benefit of provisional U.S. Patent Application No. 60/810,076, filed May 30, 2006 by Vingrelek and entitled "Estimating Data Availability on Managed Storage Devices," and which also claims the benefit of provisional U.S. Patent Application No. 60/810,075, filed May 30, 2006 by Vingrelek and entitled "Selecting Optimal Repair Strategy for Mirrored Files," the entire disclosures of which are hereby incorporated by reference, as if set forth in full in this document, for all purposes.

This application is related to co-pending U.S. patent application Ser. No. 11/516,068, filed on Sep. 5, 2006 by Vingralek et al. and entitled "Selecting Optimal Repair Strategy for Mirrored Files" the entire disclosure of which is hereby incorporated by reference, as if set forth in full in this document, for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates hard disk management in general and in particular to the configuration of disk groups to enhance data availability.

BACKGROUND OF THE INVENTION

In modern computer systems, including in particular enterprise-level systems, redundant storage is often used to protect against data loss (e.g., in the case of drive failure). Many data redundancy strategies and systems are known in the art, such as data mirroring, data striping, and the like. Many such systems utilize a group of hard disks to provide redundancy in case a single disk fails.

The configuration of a typical redundant storage system often is defined by several configurable options (such as, for example, the type of data mirroring, the number of partners assigned to each disk, the amount of bandwidth dedicated to rebalance operations, etc.), and cost and/or relative effectiveness of the system in ensuring data availability, performance, etc. is generally heavily dependent on the options selected.

While reliability statistics about individual hard disks are available (often from the manufacturers of such disks), reliability statistics about redundant storage systems are generally unpublished (at least in part because they are heavily dependent on the configuration of the particular system of interest and/or the disks incorporated in the system). Moreover, because such systems, by design, are relatively reliable, it is difficult to experimentally determine their failure rates.

Hence, it is often difficult to evaluate the relative effectiveness of various data redundancy strategies and/or to select an optimal configuration for a data storage system.

BRIEF SUMMARY OF THE INVENTION

The invention provides methods, systems and software that can be used to calculate the estimated mean time to data loss for a particular configuration of a disk group. Advantageously, certain embodiments can be used to evaluate a plurality of configurations, and to select (and/or allow a user to select) an optimal configuration of the disk group, based, in some cases, on the relative estimated mean times to data loss of the various configurations. This can allow, if desired, the configuration of the disk group to minimize the likelihood of data loss in the disk group.

Various embodiments of the invention provide, inter alia, methods, systems and software products. In some embodiments of the invention, a system (such as a computer system) might be configured to implement a method of the invention. Merely by way of example, the system might comprise, inter alia, one or more processors, along with instructions (which might be stored on a disk and/or other computer readable medium) executable by the processors to perform the method. In other embodiments, a software product might embody the method, for example as a set of instructions (which again, might be stored on a disk and/or other computer readable medium), which are executable by one or more computers to execute the method.

Merely by way of example, in accordance with one set of embodiments, a method of estimating the availability of data might be performed in a system having a set of disks comprising a plurality of hard disks. The method might comprise identifying a set of operating characteristics for each of a plurality of hard disks. In some cases, the method further comprises calculating (perhaps based at least in part on some or all of the operating characteristics of the hard disks), a first estimated mean time to data loss the set of disks. The first estimated mean time to data loss might correspond to a first configuration of the set of disks. Similarly, the method might further comprise calculating a second estimated mean time to data loss, corresponding to a second configuration of the set of disks.

In a set of embodiments, the method further comprises selecting, from among at least the first configuration and the second configuration, a configuration with the greatest estimated mean time to data loss. In a particular embodiment, the method further comprises configuring a disk group from the set of disks, according to the selected configuration.

As noted above, methods of the invention might be implemented as software, and in particular as instructions executable by one or more computers. Merely by way of example, a system for estimating the availability of data might comprise a processor and a computer readable medium in communication with the processor. (In some cases, the system might also comprise a set of disks). The computer readable medium might comprise a set of instructions executable by the processor to perform one or more methods of the invention.

By way of example, in a certain embodiment, a software program (i.e., a set of instructions) comprises instructions to receive information about each of a plurality of hard disks and/or to identify a set of operating characteristics for each of the plurality of hard disks. The set of instructions might further comprise instructions to calculate (perhaps based at least in part on the operating characteristics of the hard disks), a plurality of values. Each value represents an estimated mean time to data loss for a different configuration of the plurality of hard disks. There might be further instructions to produce a recommended configuration of the plurality of hard disks, based at least in part on the plurality of values. In some cases, the set of instructions might further comprise instructions to configure a disk group from the plurality of disks (perhaps according to the recommended configuration).

In some cases, a first value might represent an estimated mean time to data loss in a double-mirroring configuration, in which a data block on a first hard disk is mirrored on one other hard disk. In other cases, a second value might represent an estimated mean time to data loss in a triple-mirroring configuration, wherein a data block on a first hard disk is mirrored on each of two other hard disks.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

1. Overview

One set of embodiments provides systems, methods and/or software products for estimating the availability of data in a disk group, and optionally for configuring a disk group (or recommending a configuration) that maximizes data availability, perhaps depending on various constraints or parameters (including cost, performance, etc.). Depending on various parameters, for example, data availability may be enhanced through specific data mirroring and/or disk partnering configurations, as described in more detail below. Advantageously, then, embodiments of the invention can help a user or administrator to understand the impact on data availability of various alternative configurations, and, in some cases, to configure a disk group according to an optimal configuration.

As used herein, the term "data availability" indicates the likelihood that all data stored in a disk group will be available at a given time. One way of expressing data availability is through "mean time to data loss," which estimates how frequently a data block will be lost in the disk group. One factor that significantly affects data availability is data redundancy, in which data blocks are mirrored on two or more disks, such that a single disk failure will not render the data on that disk unavailable—instead, each of the mirrored copies must be simultaneously unavailable in order to render the data block unavailable.

Figure 1:
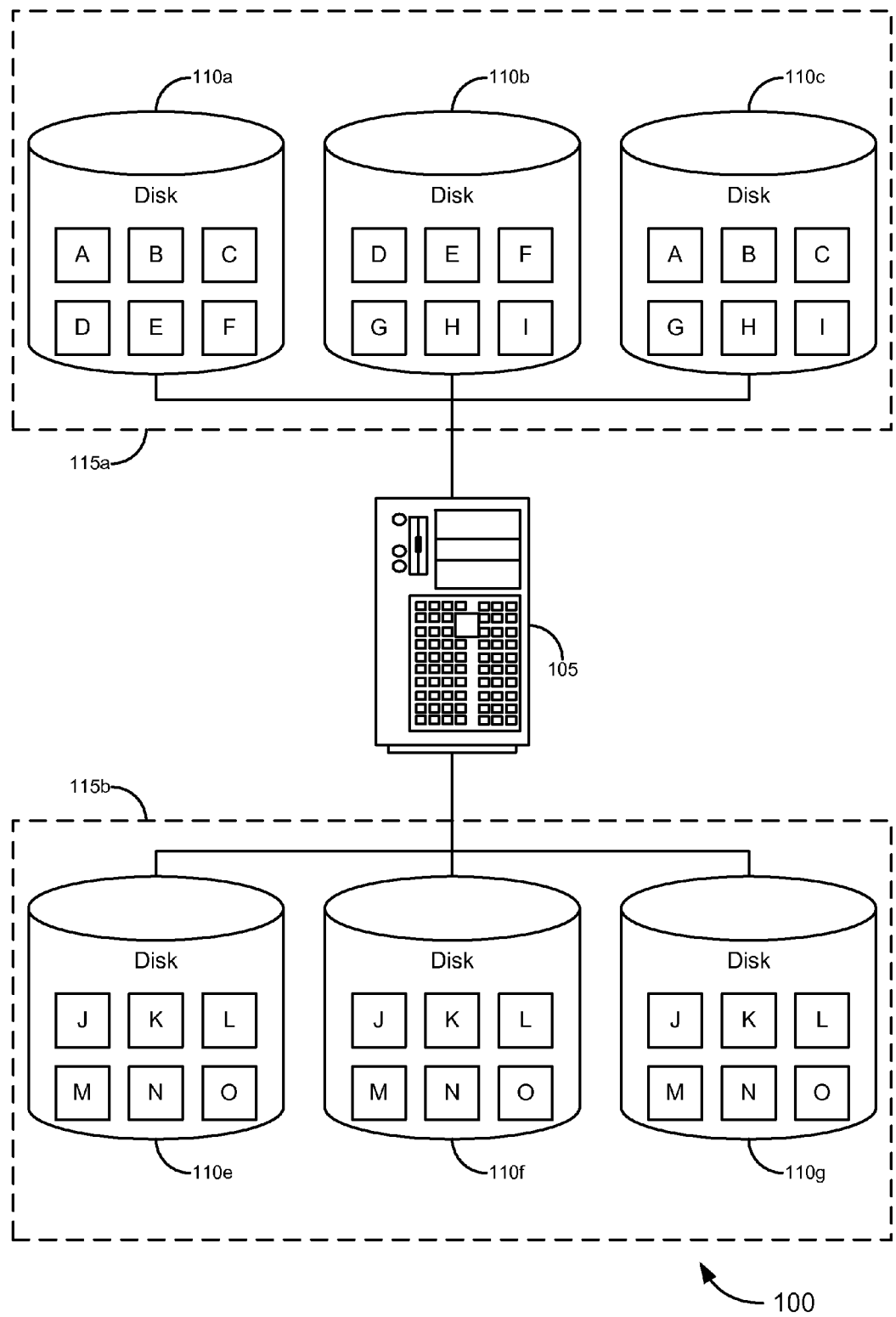
FIG. 1 is a block diagram illustrating a computer system having two disk groups, in accordance with various embodiments of the invention.

Consider, for the example, the system 100 of FIG. 1. The system 100 includes a computer 100 (which might be a server, such as, for example, those described with respect to FIG. 6, below, and/or might be any other appropriate computer) and a plurality of hard disks 110. (While, for ease of description, this document uses the term "hard disk" to refer to non-volatile storage, the term should be construed broadly to mean any storage medium that provides read and write access, including, merely by way of example, flash RAM and/or ROM, removable storage devices, etc.).

The disks 110 are arranged into disk groups 115. As defined herein, a "disk group" is any logical arrangement of disks to provide collective storage of information. There are a wide variety of ways in which disk groups can be implemented and/or organized. Merely by way of example, a disk group might be a redundant array of independent disks ("RAID"), which often is implemented via a hardware controller and/or a specific software application on the controlling computer. One skilled in the art will appreciate that there are several structures into which RAIDs are commonly organized. Merely by way of example RAID level 0 provides a data striping arrangement, in which data is striped across multiple disks in order to improve performance of the array, but provides no fault tolerance. RAID level 1 provides disk mirroring, in which the contents of one drive are mirrored on another drive. Another common arrangement, RAID level 5, provides data striping across independent disks with distributed parity blocks, while RAID level 6 provides data striping with dual parity systems, for enhanced fault tolerance. Other RAID arrangements are common as well.

As an alternative, or addition, to RAID, some software applications are configured to create and/or manage disk groups as well. Merely by way of example, Oracle Corporation's Automatic Storage Management™ (ASM) package, which is available with the Oracle 10g™ database management system, provides disk group management via a software application. In this context, each disk 110 can be considered to include either a single disk or a multi-disk array, such as a RAID system—that is, the software package, such as ASM or the like, might be configured to treat a RAID system as a single disk when configuring a disk group, such that a single group 115 might comprise multiple RAID systems, each acting logically as a single disk. Other systems and methods of creating and/or managing disk groups are possible as well.

As noted above, there are various possible arrangements of disks 110 (or RAID systems) in a group 115. Merely by way of example, the disk group 115a comprises three disks 110a-c and provides data redundancy among those disks. For instance, one disk 110a stores data blocks (also referred to herein as "extents") A-F, while another disk 110b stores data blocks D-I and a third disk 110c stores data blocks A-C and G-I. This is known as a "double-mirroring" configuration (and is also referred to herein as a "normal redundancy" or "normally-redundant" configuration), in which any given block on a particular disk will have a mirror copy on one other disk.

It should be noted that a given data block with the same label (such as data block A) stored on two different disks comprises identical copies of the same information. Hence, if a disk 110a fails, the data blocks A-F stored on that disk 110a can be recreated from their copies on the other disks 110b-c in the group. (It should also be noted that FIG. 1 is greatly simplified, for ease of description and illustration).

The disk group 115*b* of FIG. 1 provides an illustration of a triple-mirroring configuration (also referred to herein as a "high redundancy" or "highly-redundant" configuration), in which a data block on any particular disk has mirror copies on at least two other disks in the group (and, in an exemplary embodiment, on exactly two other disks in the group). Hence, in the disk group 115*b* of FIG. 1, since there are only three disks, each disk 110*e-f* stores the same data blocks (J-Q), so each data block on a particular disk 110*e* has identical copies on two other disks 110*f* and 110*g*. (It should be noted, however, in groups with more than three disks, each disk might not store the same information as all of the other disks.) As noted above, other arrangements (such as striping and/or striping with parity) are possible as well, although not illustrated on FIG. 1.

In accordance with an embodiment of the invention, each disk 110 also stores a set of metadata about the data blocks. The metadata includes, without limitation, information about whether a given data block on a particular disk is current or stale. To illustrate this concept, consider what happens when a block needs to be written to a disk. If the disk is available, the block is written and the metadata for that block is marked as current. If the disk is unavailable or the data otherwise cannot be written, however (e.g., through a disk failure, write error, etc.), the data block is marked as stale in the metadata, indicating that the data block was not successfully written to the disk.

In accordance with embodiments of the invention, the configuration of a disk group can significantly affect the data availability of that disk group. Merely by way of example, the number of partners that each disk has, the type of mirroring strategy (e.g., double mirroring, triple mirroring, etc.), the characteristics of individual disks in the group (such as mean time to failure ("MTTF"), data transfer rate, and the like) and the rebalance rate of the disk group (i.e., the proportion of the disk I/O that is used for rebalance operations) each can affect the data availability of the group.

2. Analytical Models

Embodiments of the invention, then, can be used to estimate data availability given one or more proposed disk group configurations. In accordance with a specific set of embodiments, various analytical models can be used to evaluate data availability. Some models consider the effects of various disk failures and/or preventative techniques. Merely by way of example, in some cases, read errors may be considered or neglected, the effects of data redundancy (both normal redundancy and high redundancy, as described in detail below) may be considered, the benefits of disk scrubbing may be considered, and/or the like.

As noted above, a disk group generally will comprise a plurality of hard disks. In accordance with the analytical models described herein, each disk is characterized by its failure rate $\lambda$, which is a reciprocal of the disk's mean time to failure. For purposes of these models, it is assumed that a failure is a whole-disk failure, which renders all data blocks on the failed the disk unavailable. It is also assumed that the failure rate is fixed (i.e., does not change with the disks' lifetime) and that disk failures are independent, which is valid, considering disks that are partners.

In this document, two (or more) disks are referred to as "disk partners" or "partners" if the disk group is configured so that those disks can hold redundant copies of the same extent. A disk group can be configured to have multiple sets of disk partners, such that in a disk group having disks $d_1$, $d_2$, $d_3$, and $d_4$, Disks $d_1$ and $d_s$ might be disk partners, while disks $d_3$ and $d_4$ might be disk partners. Alternatively, disks $d_1$, $d_2$, $d_3$, and $d_4$, might all be disk partners. (For purposes of the models discussed herein, it is assumed that disk partnership relationships are both transitive and symmetric.) In the models discussed herein, it is assumed that partner disks fail independently (i.e., they should not share a common controller or other single point of failure).

As noted above, the term "extent" is used herein to describe a data block; more specifically, the term "virtual extent" is used to describe a data block that is stored on two or more disks in a group, while the term "physical extent" refers to each individual copy of that data. Hence, if a virtual extent is stored on disks $d_1$ and $d_2$, there is a first physical extent on disk $d_1$ holding that data and a second physical extent on disk $d_2$ holding a copy of the same data. It should be noted that, while a partner disk may have a redundant copy of an extent on another partner disk, it need not necessarily have one. For example, if each disk in a particular group has two partners, and normal redundancy is implemented, a copy of each physical extent on the disk will reside on one (but not both) of the partners. It should also be noted that such copies can be distributed among partners, such that no single partner need have copies of all of the physical extents on a particular disk.

These models consider a disk group (which might be configured using hardware and/or low-level software tools, such as RAID, and/or higher-level software tools, such as database storage managers, of which Oracle ASM is an example) with n disks, where each disk can have up to k partners. For simplicity, it is assumed that each disk has exactly k partners.

In addition to whole-disk failures, individual blocks of a disk may exhibit unrecoverable read errors, (i.e., errors that cannot be recovered from using the disk controller's error correction code ("ECC") mechanism. The unrecoverable errors occur with a probability $p_{block}$.

Following a failure of $i \in \{1,2\}$ disks that are partners of each other, the redundancy of all allocated files can be restored by a rebalance operation at a rate $\mu_i$. (A rebalance operation is one in which data blocks—which are also referred to herein as extents—on a failed disk are copied, usually from mirrored blocks on a partner disk, to new disks, to restore the required redundancy to the data blocks.) For purposes of these models, it is assumed that the rebalance operation following a disk drop is initiated after a timeout $t_f$ and is constrained (by input-output ("I/O") limitations) on reading the redundant copies of the extents allocated on the partners of the failed disks (this is likely to be true if n>k). Therefore, the repair rate can be expressed as $$\mu_i = \left( \frac{f}{(k-i)rb} + t_f \right)^{-1} \quad (1)$$

where f is the expected size of all extents allocated on a disk, b is the maximum bandwidth of a disk and r is the fraction of the bandwidth used by the rebalance operation.

Figure 2A:
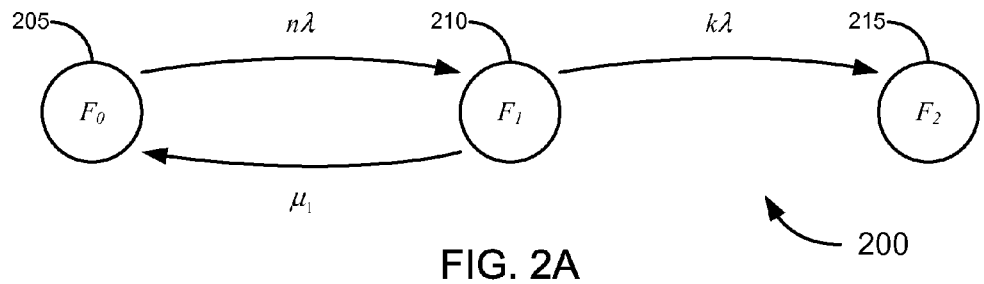
FIGS. 2A-2D are state diagrams illustrating Markov chains representing transition states for various modes of disk failures.
Figure 2B:
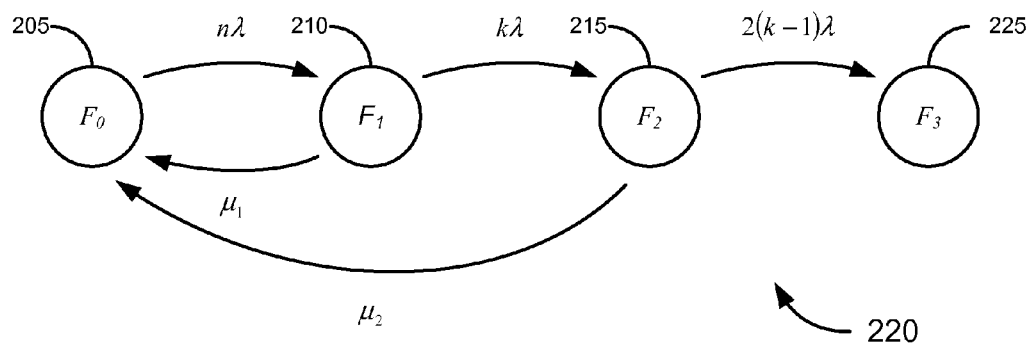

$F_i$ denotes a disk group failure state with i pair-wise partnering disks failed. Each disk group has exactly one absorbing state (i.e., a state that cannot be transitioned from). To illustrate this concept, FIG. 2A illustrates a Markov chain 200 for a disk group with normal redundancy (i.e., where there are two physical extents, on two different disks, corresponding to each virtual extent). State $F_0$ 205 indicates a normal state, in which all disks are operating available. State $F_1$ 210 indicates a failure state, in which a disk has failed, leaving a single copy of data on the failed disk available (from the failed disk's partner). Because the data can be restored from the partner, state $F_1$ is considered non-absorbing (i.e., transition from state $F_1$ 210 to state $F_0$ 205 can be achieved by restoring the redundancy of data from the partner). In FIG. 2A, state $F_2$ 215 indicates a failure state in which a disk and its partner have both failed. State $F_2$ can be considered absorbing, since there is no available copy of the data (since the disk and its partner collectively held all available copies of the data). As another example, FIG. 2B illustrates a Markov chain 220 for a disk group with high redundancy (i.e., where each disk has two partner disks). In this high redundancy configuration, state $F_3$ 225 is absorbing, since it represents a condition where a disk and both of its partners have failed, whereas state $F_2$ is not absorbing, since even if a disk and one of its partners fails, the data is available from the second partner. A random variable $t_i$ denotes the time to transition from state $F_i$ to the absorbing state. Therefore, $E(t_0)$ represents mean time to failure of a disk group.

A. Normal Redundancy

As noted above, FIG. 2A illustrates a Markov chain for a disk group with normal redundancy. The transition from state $F_0$ to $F_1$ occurs when any disk d in the disk group fails. The transition from state $F_1$ to the absorbing state $F_2$ occurs when a partner of disk d fails.

The Markov chain 200 of FIG. 2A constrains the expected values of $t_i$ by $$E(t_0) = \frac{1}{n\lambda} + E(t_1) \qquad (2)$$

$$E(t_1) = \frac{1}{\mu_1 + k\lambda} + \frac{\mu_1}{\mu_1 + k\lambda} E(t_0) \qquad (3)$$

which solves for $E(t_0)$ as $$E(t_0) = \frac{\mu_1 + n\lambda + k\lambda}{nk\lambda^2} \qquad (4)$$

For typical disks and n<10,000, this simplifies to $$E(t_0) \approx \frac{\mu_1}{nk\lambda^2} \qquad (5)$$

B. High Redundancy

Also as noted above FIG. 2B illustrates a Markov chain 200 for a high redundancy configuration, in which each virtual extent corresponds to three physical extents. In this configuration, transitions between states $F_0$ 205, 210, and $F_2$ 215 occur at the same rates as in a normal redundancy group. However, as noted above, state $F_2$ is not absorbing. Assuming that in state $F_2$ there are two failed partner disks $d_1$ and $d_2$, the transition to state $F_3$ occurs whenever one of the remaining k-1 partners of either $d_1$ or $d_2$ fails.

In this model, the expected values of $t_i$ are constrained by $$E(t_0) = \frac{1}{n\lambda} + E(t_1) \qquad (6)$$

$$E(t_1) = \frac{1}{\mu_1 + k\lambda} + \frac{\mu_1}{\mu_1 + k\lambda} E(t_0) + \frac{k\lambda}{\mu_1 + k\lambda} E(t_2) \qquad (7)$$

$$E(t_2) = \frac{1}{\mu_2 + 2(k-1)\lambda} + \frac{\mu_2}{\mu_2 + 2(k-1)\lambda} E(t_0) \qquad (8)$$

which solves for $E(t_0)$ as $$E(t_0) = \frac{\mu_1\mu_2 + 2k(k-1)\lambda^2 + 2n(k-1)\lambda^2 + nk\lambda^2 + k\lambda\mu_2 + n\lambda\mu_2 + 2(k-1)\mu_1\lambda}{2nk(k-1)\lambda^3} \qquad (9)$$

For typical disks and n<10,000, this can be simplified to:

$$E(t_0) \approx \frac{\mu_1\mu_2}{2nk(k-1)\lambda^3} \qquad (10)$$

C. Normal Redundancy with Read Errors

Figure 2C:
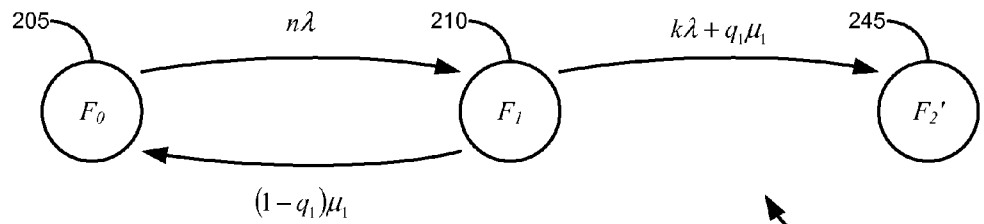

In some cases, unrecoverable read errors can effect the estimate of data availability. Hence, FIG. 2C illustrates a Markov chain 240 representing a special case of the Markov chain 200 of FIG. 2A, described above, to account for unrecoverable read errors. For simplicity, this model does not attempt to account for double or triple read errors of the same block, as they are unlikely.

In this model, $$q_i = 1 - (1 - p_{block})^{if} \qquad (11)$$

can be considered the probability that a read fails during a rebalance following a failure of i partner disks, where $p_{block}$ is the probability a block read fails and f is the expected size of extents allocated to a disk expressed in the number of blocks.

The probability that a block cannot be read ($p_{block}$) can be expressed as $$p_{block} = 1 - (1 - p_{bit})^B \qquad (12)$$

where $p_{bit}$ is the probability of an unrecoverable bit read error (as commonly provided by disk manufacturers) and B is the size of a disk block in bits.

The modified Markov chain 240 of FIG. 2C transitions from state 210 to state $F_0$ 205 at a rate $(1-q_1)\mu_1$ when the rebalance succeeds. It transitions from state $F_1$ 210 to a new state $F'_1$ at a rate $q_1\mu_1$ when the rebalance fails due to a read error. Since Markov chain transitions occur at exponentially distributed times, the two absorbing states $F_2$ and $F'_1$ can be merged into a single absorbing state $F'_2$ with a transition rate from state $F_1$ to state $F'_2$ of with a transition rate of $k\lambda+q_1\mu_1$ as illustrated in the Markov chain 240 of FIG. 2C, which solves for $E(t_0)$ as $$E(t_0) = \frac{\mu_1 + n\lambda + k\lambda}{n\lambda(k\lambda + q_1\mu_1)} \qquad (13)$$

For typical disks and n<10,000, this simplifies to $$E(t_0) \approx \frac{\mu_1}{n\lambda(k\lambda + q_1\mu_1)} \qquad (14)$$

D. High Redundancy with Read Errors

Figure 2D:
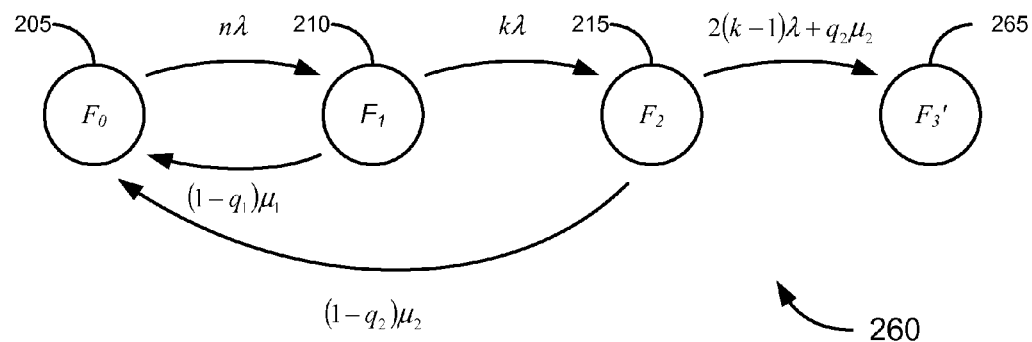

Similarly, FIG. 2D illustrates a Markov chain 260 that is a special case of the Markov Chain 220 of FIG. 2B. The Markov chain 260 solves for $E(t_0)$ as $$E(t_0) = \frac{\mu_1\theta_2 + k\lambda\theta_1 + n\lambda\theta_1 + n\lambda^2 k + k\lambda\theta_2 + n\lambda\theta_2 + \mu_1\theta_1}{n\lambda^2 k\theta_1} \qquad (15)$$

where $$\theta_1 = 2(k-1)\lambda + \frac{q_2}{\mu_2} \text{ and } \theta_2 = (1-q_2)\mu_2.$$

For typical disks and n<10,000, this simplifies to $$E(t_0) \approx \frac{\mu_1(1-q_2)\mu_2}{nk\lambda^2(2(k-1)\lambda + q_2\mu_2)} \quad (16)$$

E. Disk Scrubbing

Disk scrubbing generally reduces the probability that a data will be lost due to an unrecoverable read error following a disk failure. In a typical disk scrubbing operation, when an unrecoverable read error is found during scrubbing, the offending block is rewritten with the content of one of its mirrored copies and/or relocated to another location on the same disk (for example, if the block is unreadable even after the re-write).

This disclosure models disk scrubbing only in normal redundancy disk groups. While disk scrubbing can be modeled, in similar fashion, for high redundancy disk groups, those high redundancy disk groups often exhibit relatively high data availability even when accounting for unrecoverable read errors.

In a typical case, an unrecoverable read error often results from either current and/or transient environmental conditions (e.g., unsuitable temperature, vibration, humidity, etc.) or by an improper recording on the media (e.g., the recording head was too high during the last write). The read errors caused by the environment are typically transient, so once the conditions improve the read succeeds. Disk scrubbing does not change the environmental conditions and therefore generally cannot be considered to reduce the probability of such errors. The read errors caused by media are typically persistent and thus often can be reduced by disk scrubbing. The probability of a block read failure $p_{block}$ can be expressed as $$p_{block} = p_e + p_m \quad (17)$$

where $p_e$ is the probability of a read error caused by the environment and $p_m$ is the probability of a read error caused by the media.

Since the proportions of $p_e$ and $p_m$ are difficult to estimate in the general case, this model assumes that all read errors are caused by improper media recording (i.e., $p_e=0$) and therefore all read errors can be reduced by disk scrubbing. Should $p_e \neq 0$, disk scrubbing would be less effective than predicted by the model, since the scrubbing would not impact some of the causes of read errors.

At any time a block can be either readable (state R) or unreadable (state U). This model assigns the variable $\alpha$ to the rate at which the block transitions to state U (from state R) and the variable $\beta$ to the rate at which the block transitions from state U to state R. The rates $\alpha$ and $\beta$ satisfy the following equation:

$$\frac{\alpha}{\beta} = \frac{p_{block}}{1 - p_{block}} \quad (18)$$

where $p_{block}$ can be calculated using equation (12) above.

In an absence of disk scrubbing, an unreadable block media generally can repaired only by being overwritten. Such repair must occur, otherwise the number of unreadable blocks on a disk would grow with time, eventually rendering the disk unusable. Therefore, this model assumes $\beta=\omega$, where $\omega$ is the rate at which blocks of a disk are written. Consequently, Equation (18) can be solved for $\alpha$ thusly:

$$\alpha = \frac{p_{block}}{1 - p_{block}}\omega \quad (19)$$

In a typical case, $p_{block} \ll 1$, so equation (19) can be approximated by $$\alpha \approx p_{block}\omega \quad (20)$$

Disk scrubbing increases the rate each block is written by $\sigma$. Therefore, $\beta = \sigma + \omega$. This equality, together with equation (19) can be substituted into equation (18) to express the probability that a block is unreadable when the disk is scrubbed at a rate $\sigma$ as $$p_{block}^{\sigma} = \frac{\omega}{\omega + (1 - p_{block})\sigma} p_{block} \quad (21)$$

which, when $p_{block} \ll 1$, simplifies to $$p_{block}^{\sigma} \approx \frac{\omega}{\omega + \sigma} p_{block} \quad (22)$$

The probability that a read fails during a rebalance following a disk failure $q_1$ is expressed by using Equation (11) above, and substituting $p_{block}^{\sigma}$ for $p_{block}$. The remainder of the formulas remain the same as expressed above.

The improvement resulting from scrubbing in the probability that a block cannot be read is expressed by $$p_{block} / p_{block}^{\sigma} = 1 + (1 - p_{block})\frac{\sigma}{\omega} \quad (23)$$

Therefore, to reduce the probability that a block cannot be read by a factor of l, the scrubbing rate $\sigma$ must be set to $$\sigma_l = \frac{l-1}{1 - p_{block}}\omega \quad (24)$$

which, when $p_{block} \ll 1$, simplifies to $$\sigma_l \approx (l-1)\omega \quad (25)$$

Hence, this model indicates that, in most cases, the scrubbing rate must exceed the write rate to a disk in order to substantially improve the disk group's mean time to data loss.

3. Exemplary Embodiments

Figure 3:
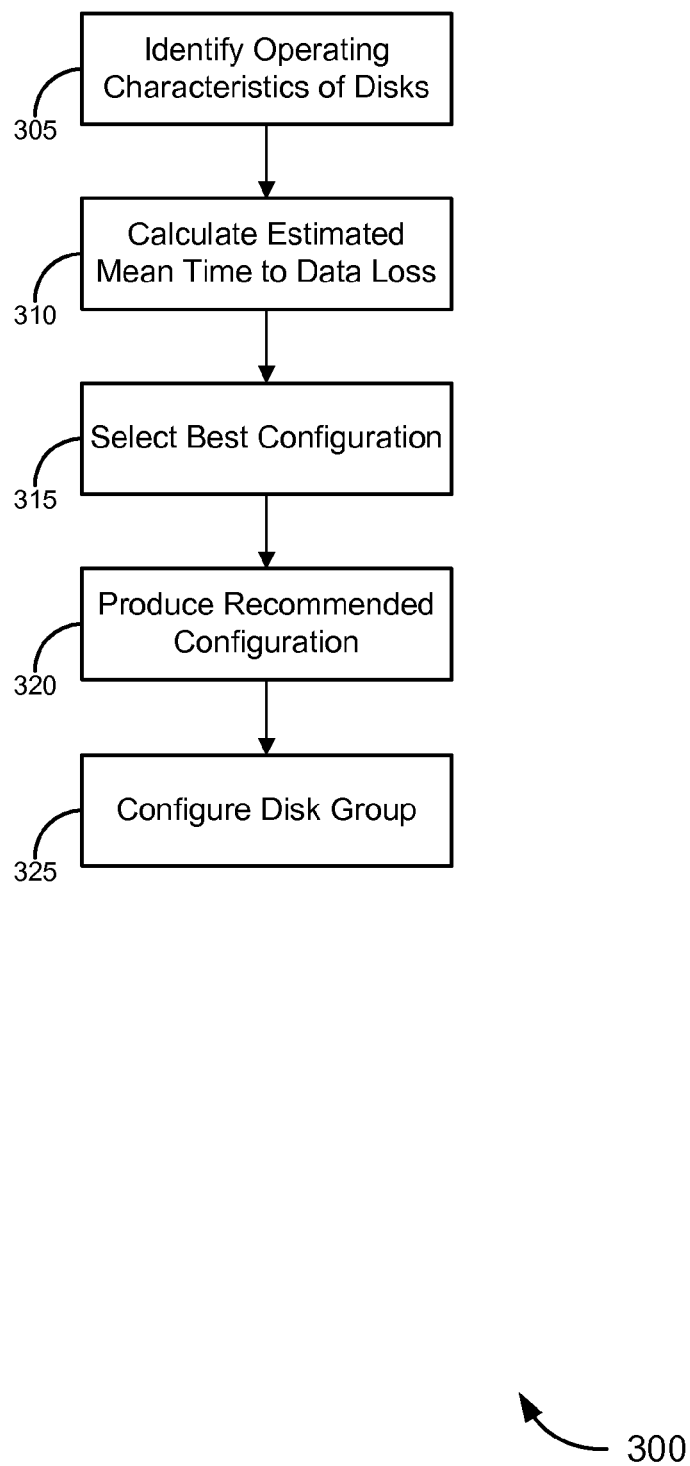
FIG. 3 is process flow diagram illustrating a method of estimating data availability in a disk group, in accordance with various embodiments of the invention.

FIG. 3 illustrates a method 300 of estimating the data availability of a disk group, in accordance with a set of embodiments. At block 305, the method comprises identifying the operating characteristics of the disks in the disk group. As noted above, there are many characteristics of a hard disk that might affect the data availability of a disk group comprising that disk. A few examples of such characteristics include, without limitation, storage capacity, input/output bandwidth, a mean time to failure, and a probability of read error. In many cases, data about such characteristics are published by drive manufacturers and/or is otherwise available. Accordingly, identifying the disk characteristics might comprise searching a database (which might be provided by software that provides the data availability estimation and/or other software) for such information and/or searching other data sources (such as the Internet, for example) for such information. In other cases, a user might be allowed and/or prompted to provide such information.

Hence, in some embodiments, the method 300 might include receiving information about the disks. (This procedure might be integrated with identifying the operating characteristics of the disks and/or might be considered a separate procedure.) Such information can be received from a user (e.g., through manual input), by hardware interrogation of the disks themselves, and/or any other appropriate procedure. In an embodiment, the information might comprise the operating characteristics. Merely by way of example, as mentioned above, receiving the information might comprise interrogating and/or testing the disks to obtain the operating characteristics, receiving the operating characteristics from a user and/or a data source, and/or the like. In another embodiment, the information might comprise identifying information (such as manufacturer, model number, and/or serial number, etc.) about the disk, which might facilitate searching for the operating characteristics.

In certain situations, some disk characteristics can be determined through empirical testing, and in such situations, identifying disk characteristics might comprise determining the characteristics through empirical testing. In some cases, embodiments of the invention can perform such empirical testing. Merely by way of example, read and/or write test operations can be performed on a disk to determine I/O throughput, search times and/or the like.

The method 300 further comprises calculating an estimated mean time to data loss for a proposed configuration of the disk group (block 310). In some cases, the proposed configuration of the disk group is an actual configuration, and embodiments of the invention can be used to estimate the estimated mean time to data loss for the currently-configured disk group. In other cases, the disk group might not currently be configured, and embodiments of the invention might be configured to compare a plurality of proposed configurations, as described in more detail below, so as to select a best configuration.

A configuration of a disk group can comprise one or more of a variety of factors. Merely by way of example, in some embodiments, the number of disks n in a disk group can affect the mean time to data loss. As another example, a particular redundancy strategy (e.g., double mirroring, triple mirroring, etc.) might be used in a proposed configuration. Similarly, disk scrubbing might (or might not) be used in a proposed configuration. The number of disk partners is another factor that might be included in a proposed configuration, as is the proportion of disk I/O to be dedicated to rebalance operations. Hence, in accordance with some embodiments, the estimated mean time to data loss might be calculated based, at least in part, on one or more of the identified disk characteristics, as well as one or more of these configuration-specific factors and/or one or more of the factors described in detail in Section 2 above.

Similarly, in accordance with some embodiments, one or more of the analytical models described above can be used to calculate the estimated mean time to data loss. Merely by way of example, if a proposed configuration includes normal redundancy (i.e., double-mirroring, the analytical model described in Section 2.A might be used to calculate the estimated mean time to data loss, while if a proposed configuration includes high redundancy (i.e., triple mirroring), the analytical model described in Section 2.B might be used. Similarly, if disk scrubbing is considered as an element of a proposed configuration, the principles of Section 2.C might be used in performing the calculation.

In some cases, a plurality values for estimated mean times may be calculated for a plurality of configurations (i.e., an estimated mean time for each configuration). Merely by way of example, a first estimated mean time to data loss might be calculated for a first configuration, and a second estimated mean time to data loss might be calculated for a second configuration. Additional configurations might be considered in similar fashion.

At block 315, a best configuration is selected. In a set of embodiments, the best configuration is the configuration with the greatest mean time to data loss. In other embodiments, the best configuration might not necessarily be the configuration with the greatest mean time to data loss, but might instead account for other factors (such as I/O performance, cost per disk, etc.). In some cases, selecting a best configuration might include displaying and/or printing the configuration (and/or various factors incorporated in the configuration) for a user, providing the user with instructions on how to implement the best configuration, etc. Similarly, in a set of embodiments, the method comprises producing a recommended configuration (block 320), which might be the selected configuration.

In another set of embodiments, the method comprises configuring the disk group (block 325), perhaps using a best and/or recommended configuration. Embodiments of the invention might be implemented in a disk group configuration utility (which might be part of an operating system and/or a larger application, such as a DBMS, and/or might be a standalone application, applet, control panel, etc.). In some implementations, some or all of the procedures for configuring a disk group may be performed automatically by a disk group configuration tool. In other implementations, configuring the disk group might comprise providing instructions (as a list, via a guided process such as a wizard, etc.) to allow a user to manually perform some or all of the procedures to configure the disk group. Based on the disclosure herein, one skilled in the art will appreciate that the procedures to configure a disk group are highly dependent on the implementation, and that several such procedures are known in the art; hence, a detailed description of those procedures need not be provided.

Figure 4:
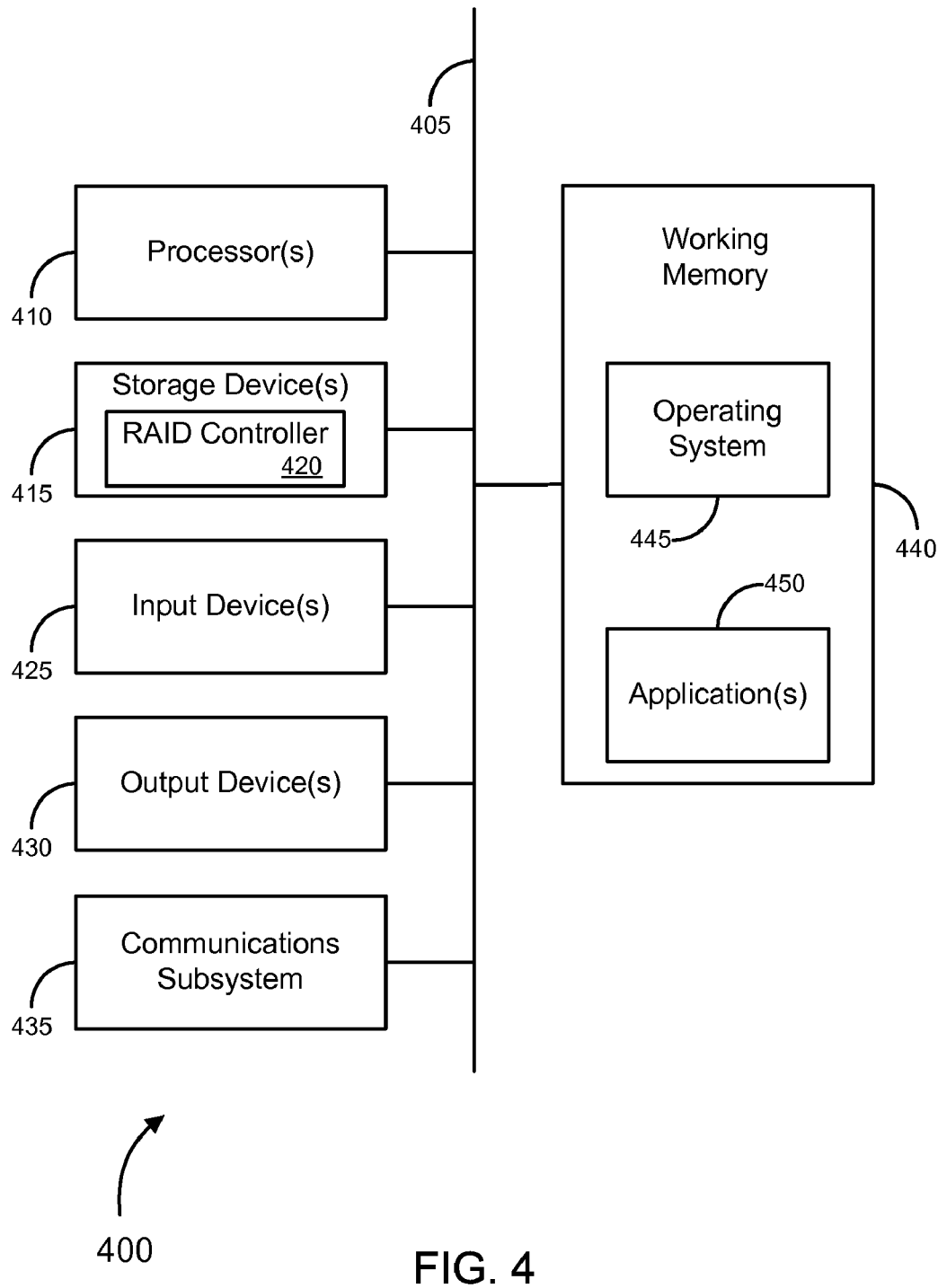
FIG. 4 is a generalized schematic diagram illustrating a computer system that can be used in accordance with various embodiments of the invention.

FIG. 4 provides a generalized schematic illustration of one embodiment of a computer system 400 that can perform the methods of the invention and/or the functions of computer, such as the computers described above. FIG. 4 is meant only to provide a generalized illustration of various components, any of which may be utilized as appropriate. The computer system 400 can include hardware components that can be coupled electrically via a bus 405, including one or more processors 410. In addition, one or more storage devices 415 might be coupled to the bus.

Such storage devices 415 can include without limitation a disk drive, an optical storage device, solid-state storage device such as a random access memory ("RAM") and/or a read-only memory ("ROM"), which can be programmable, flash-updateable and/or the like (and which can function as a data store). As noted above, in some embodiments, the storage devices 415 might comprise a storage system, including one or more disk groups that can be managed in accordance with embodiments of the invention. (The hard disks in such a group need not be physically enclosed within the computer system 400, but instead might be in communication with, and/or controlled by, the computer system). In some cases, also as noted above, a disk group might include one or more RAID systems, and the computer system 400 might include a RAID controller 420 that is operable to configure and/or manage such RAID systems, for instance, to implement methods of the invention.

Also in communication with the bus 405 can be one or more input devices 425, which can include without limitation a mouse, a keyboard and/or the like; one or more output devices 430, which can include without limitation a display device, a printer and/or the like; and a communications subsystem 435; which can include without limitation a modem, a network card (wireless or wired), an infra-red communication device, and/or the like).

The computer system 400 also can comprise software elements, shown as being currently located within a working memory 440 (but which could also more permanently be stored on one or more of the storage devices 415 and/or other computer readable media). The software elements generally will include one or more sets of instructions that are executable by the computer system 405. Specifically, the software elements can including, without limitation, an operating system 440 and/or other code 445, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

Figure 5:
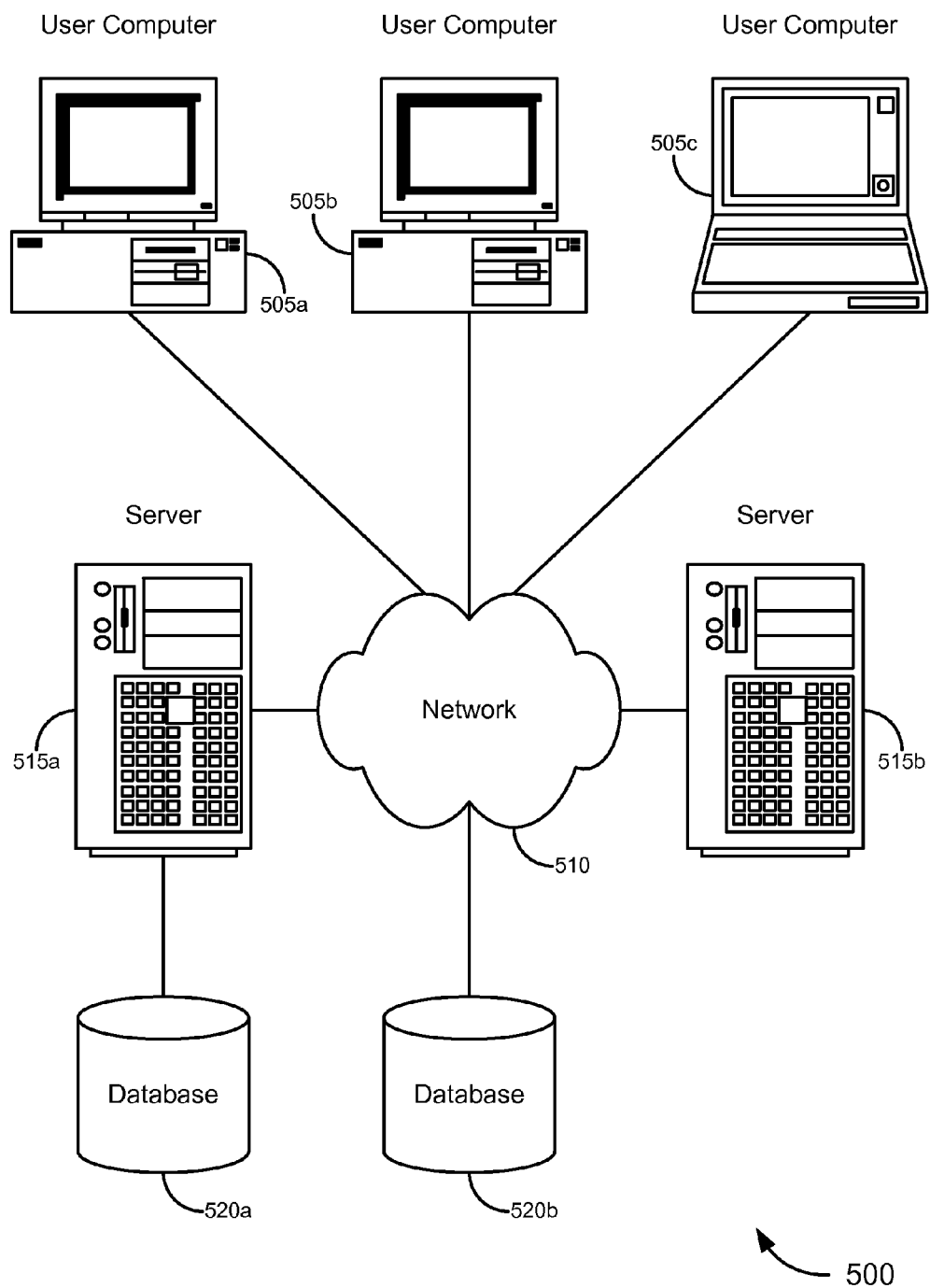
FIG. 5 is a block diagram of a networked computer system that can be used in accordance with various embodiments of the invention.

As noted above, a set of embodiments comprises systems for repairing a disk group. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant, capable of communicating via a network (e.g., the network 510 described below) and/or displaying and navigating web pages or other types of electronic documents. Although the exemplary system 500 is shown with three user computers, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system including without limitation any of those discussed above, as well as any commercially-available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more file and or/application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 505 and/or another server 515. In some embodiments, an application server can create web pages dynamically for displaying information about disk groups and/or for initiating and/or performing disk group configuration and/or repair operations. Data provided by an application server may be formatted as web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server.

In accordance with further embodiments, one or more servers 515 can function as a file server and/or can include one or more of the files necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as it can be in communication (e.g., via the network 510) with one or more of these. In a particular set of embodiments, a database 520 can reside in a storage-area network ("SAN") familiar to those skilled in the art. The SAN might be implemented as a disk group in accordance with embodiments of the invention. (Likewise, any necessary files for performing the functions attributed to the computers 505, 515 can be stored locally on the respective computer and/or remotely, as appropriate.) In one set of embodiments, the database 535 can be a relational database, such as an Oracle database, that is adapted to store, update, and retrieve data in response to SQL-formatted commands. The database might be controlled and/or maintained by a database server, as described above, for example. In particular embodiments, the database server might be configured with DBMS software and/or Automated Storage Management™ software, which can be used to create, configure and/or repair disk groups, and/or test proposed disk group configurations, in accordance with embodiments of the invention.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for maximizing availability of data, the system comprising:
    a set of disks comprising a plurality of hard disks;
    a processor in communication with each of the plurality of hard disks; and
    a computer readable medium in communication with the processor, the computer comprising a set of instructions executable by the processor, the set of instructions comprising:
    instructions to identify a set of operating characteristics for each of the plurality of hard disks, the set of operating characteristics affecting the availability of data of the plurality of hard disks, wherein the instructions to identify the set of operating characteristics comprise interrogating the plurality of disks, testing the plurality of disks, searching a database, and receiving the set of operating characteristics;
    instructions to calculate, based at least in part on the operating characteristics of the plurality of hard disks, a first estimated mean time to data loss for the set of disks, the first estimated mean time to data loss corresponding to a first configuration of the set of disks, the first configuration defined based at least in part on a first selection of configurable options;
    instructions to calculate, based at least in part on the operating characteristics of the plurality of hard disks, a second estimated mean time to data loss for the set of disks, the second estimated mean time to data loss corresponding to a second configuration of the set of disks, the second configuration defined based at least in part on a second selection of configurable options;
    instructions to select, from among at least the first configuration and the second configuration, a configuration with a greatest estimated mean time to data loss; and
    instructions to configure, according to the selected configuration, a disk group from the set of disks.

2. A system as recited by claim 1, wherein the set of disks comprises a redundant array of independent disks ("RAID") system.

3. A system as recited by claim 1, wherein the system further comprises a database management system comprising a storage management interface configured to control the plurality of hard disks.

4. A system as recited by claim 1, wherein the instructions to configure a disk group comprise instructions to re-configure an existing disk group comprising one or more of the plurality of hard disks.

5. A system as recited by claim 1, wherein the selected configuration comprises a data striping configuration.

6. A system as recited by claim 1, wherein the selected configuration comprises a data mirroring configuration, such that each data block on each hard disk is mirrored on at least one other hard disk.

7. A system as recited by claim 6, wherein the selected configuration comprises a disk mirroring configuration, such that each data block on a particular hard disk is mirrored on one other hard disk.

8. A system as recited by claim 6, wherein the selected configuration comprises a doubled-mirroring configuration, such that each data block on a particular hard disk is mirrored on two other hard disks.

9. A system as recited by claim 1, wherein a set of operating characteristics for a particular hard disk comprises a characteristic selected from the group consisting of a input/output bandwidth, a mean time to failure, and a probability of read error.

10. A method for maximizing availability of data in a system having a set of disks comprising a plurality of hard disks, the method comprising:
    identifying, by a computer system, a set of operating characteristics for each of the plurality of hard disks, the set of operating characteristics affecting the availability of data of the plurality of hard disks;
    calculating, by the computer system and based at least in part on the operating characteristics of the plurality of hard disks, a first value of estimated mean time to data loss for the set of disks, the first value of estimated mean time to data loss corresponding to a first configuration of the set of disks, the first configuration defined based at least in part on a first selection of configurable options;

calculating, by a computer system and based at least in part on the operating characteristics of the plurality of hard disks, a second value of estimated mean time to data loss for the set of disks, the value of second estimated mean time to data loss corresponding to a second configuration of the set of disks, the second configuration defined based at least in part on a second selection of configurable options;

selecting, by a computer system, from among at least the first configuration and the second configuration, a configuration with a greatest estimated mean time to data loss; and configuring, by a computer system and according to the selected configuration, a disk group from the set of disks, wherein the first and second values represent an estimated mean time to data loss in a triple-mirroring configuration, wherein a data block on a first hard disk is mirrored on each of two other hard disks, and the values are calculated using a formula of $$E(t_0) = \frac{\mu_1\mu_2 + 2k(k-1)\lambda^2 + 2n(k-1)\lambda^2 + nk\lambda^2 + k\lambda\mu_2 + n\lambda\mu_2 + 2(k-1)\mu_1\lambda}{2nk(k-1)\lambda^3}$$

wherein $E(t_0)$ is an estimated value, $\mu_1$ is a first rebalance rate signifying a rate at which data from a first disk can be restored to another disk, $\mu_2$ is a second rebalance rate signifying a rate at which data from a second disk can be restored to another disk, wherein the second disk is a partner of the first disk, k represents a number of disk partners for the first disk, and $\lambda$ is the failure rate of a disk, expressed as a reciprocal of a mean time to failure for a disk.

11. A system for maximizing availability of data, the system comprising:

a set of disks comprising a plurality of hard disks;

means for identifying a set of operating characteristics for each of the plurality of hard disks;

means for calculating, based at least in part on the operating characteristics of the plurality of hard disks, a first value of estimated mean time to data loss for the set of disks, the first value of estimated mean time to data loss corresponding to a first configuration of the set of disks, the first configuration defined based at least in part on a first selection of configurable options;

means for calculating, based at least in part on the operating characteristics of the plurality of hard disks, a second value of estimated mean time to data loss for the set of disks, the second value of estimated mean time to data loss corresponding to a second configuration of the set of disks, the second configuration defined based at least in part on a second selection of configurable options;

means for selecting, from among at least the first configuration and the second configuration, a configuration with a greatest estimated mean time to data loss; and means for configuring, according to the selected configuration, a disk group from the set of disks, wherein the first and second values represent an estimated mean time to data loss in a triple-mirroring configuration, wherein a data block on a first hard disk is mirrored on each of two other hard disks, and the values are calculated using a formula of $$E(t_0) \approx \frac{\mu_1\mu_2}{2nk(k-1)\lambda^3}$$

wherein $E(t_0)$ is an estimated value, $\mu_1$ is a first rebalance rate signifying a rate at which data from a first disk can be restored to another disk, $\mu_2$ is a second rebalance rate signifying a rate at which data from a second disk can be restored to another disk, wherein the second disk is a partner of the first disk, k represents a number of disk partners for the first disk, and $\lambda$ is the failure rate of a disk, expressed as a reciprocal of a mean time to failure for a disk.

12. A system for maximizing availability of data, the system comprising:

a processor; and a computer readable medium in communication with the processor, the computer comprising a set of instructions executable by the processor, the set of instructions comprising:

instructions to receive information about each of a plurality of hard disks;

instructions to identify a set of operating characteristics for each of the plurality of hard disks;

instructions to calculate, based at least in part on the operating characteristics of the plurality of hard disks, a plurality of values, each value representing an estimated mean time to data loss for a different configuration of the plurality of hard disks, each configuration defined based at least in part on a selection of configurable options; and instructions to produce a recommended configuration of the plurality of hard disks, based at least in part on the plurality of values, wherein each value represents an estimated mean time to data loss in a triple-mirroring configuration, wherein a data block on a first hard disk is mirrored on each of two other hard disks, and each value is calculated as a product of a first rebalance rate and a second rebalance rate divided by a divisor, the divisor based upon a number of disks, a number of disk partners for a first disk, and the failure rate of a disk, the first rebalance rate signifying a rate at which data from the first disk can be restored to another disk, and the second rebalance rate signifying a rate at which data from a second disk can be restored to another disk, wherein the second disk is a partner of the first disk.

13. A system as recited by claim 12, wherein the set of instructions further comprises:

instructions to configure, according to the recommended configuration, a disk group from the plurality of disks.

14. A system as recited by claim 12, wherein a first value represents an estimated mean time to data loss in a double-mirroring configuration, in which a data block on a first hard disk is mirrored on one other hard disk.

15. A system as recited by claim 14, wherein the first value is calculated using a formula of $$E(t_0) = \frac{\mu_1 + n\lambda + k\lambda}{nk\lambda^2}$$

wherein $E(t_0)$ is the first value, $\mu_1$ is a rebalance rate signifying a rate at which data from a particular disk can be restored to another disk, n represents a total number of disks in the disk group, k represents a number of disk partners for the particular disk, and λ is the failure rate of a disk, expressed as a reciprocal of a mean time to failure for a disk.

16. A system as recited by claim 14, wherein the first value is calculated using a formula of $$E(t_0) \approx \frac{\mu_1}{nk\lambda^2}$$

wherein $E(t_0)$ is the first value, $\mu_1$ is a rebalance rate signifying a rate at which data from a particular disk can be restored to another disk, n represents a total number of disks in the disk group, k represents a number of disk partners for the particular disk, and λ is the failure rate of a disk, expressed as a reciprocal of a mean time to failure for a disk.

17. A system as recited by claim 16, wherein the rebalance rate is calculated using a formula of $$\mu_1 = \left(\frac{f}{(k-1)rb} + t_f\right)^{-1}$$

wherein $\mu_1$ is the rebalance rate, f is the expected size of a set of all data blocks allocated on the particular disk, b is the maximum input/output bandwidth of the particular disk, r is a fraction of the maximum bandwidth used to perform a rebalance operation, and $t_f$ is a timeout before the rebalance operation is initiated.

18. A system as recited by claim 14, wherein the first value is calculated using a formula of $$E(t_0) = \frac{\mu_1 + n\lambda + k\lambda}{n\lambda(k\lambda + q_1\mu_1)}$$

wherein $E(t_0)$ is the first value, $\mu_1$ is a rebalance rate signifying a rate at which data from a particular disk can be restored to another disk, n represents a total number of disks in the disk group, k represents a number of disk partners for the particular disk, $q_1$ represents a probability that a read fails during a rebalance operation, and λ is the failure rate of a disk, expressed as a reciprocal of a mean time to failure for a disk.

19. A system as recited by claim 12, wherein the second rebalance rate is calculated using a formula of $$\mu_2 = \left(\frac{f}{(k-2)rb} + t_f\right)^{-1}$$

wherein $\mu_2$ is the second rebalance rate, f is the expected size of a set of all data blocks allocated on the particular disk, b is the maximum input/output bandwidth of the particular disk, and r is a fraction of the maximum bandwidth used to perform a rebalance operation.

20. A computer software program stored on a non-transitory computer readable medium comprising a set of instructions executable by one or more computers, the set of instructions comprising:
   instructions to receive information about each of a plurality of hard disks;
   instructions to identify a set of operating characteristics for each of the plurality of hard disks, wherein the instructions to identify the set of operating characteristics comprise interrogating the plurality of disks, testing the plurality of disks, searching a database, and receiving the set of operating characteristics;
   instructions to calculate, based at least in part on the operating characteristics of the plurality of hard disks, a plurality of values, each value representing an estimated mean time to data loss for a different configuration of the plurality of hard disks, each configuration defined based at least in part on a selection of configurable options; and
   instructions to produce a recommended configuration of the plurality of hard disks having the greatest value of estimated mean time to data loss.

\* \* \* \* \*

UNITED STATES PATENT AND TRADEMARK OFFICE
CERTIFICATE OF CORRECTION

PATENT NO. : 8,291,260 B2
APPLICATION NO. : 12/651625
DATED : October 16, 2012
INVENTOR(S) : Vingralek Page 1 of 1

It is certified that error appears in the above-identified patent and that said Letters Patent is hereby corrected as shown below:

In column 1, line 13, delete "Vingrelek" and insert -- Vingralek --, therefor.

In column 1, line 17, delete "Vingrelek" and insert -- Vingralek --, therefor.

In column 5, line 63, delete "$d_4$," and insert -- $d_4$. --, therefor.

In column 7, line 42, delete "210," and insert -- $F_1$ 210, --, therefor.

In column 8, line 32, delete "210" and insert -- $F_1$ 210 --, therefor.

In column 8, line 39, delete "$k\lambda+q_1\mu_1$" and insert -- $k\lambda+q_1\mu_1$, --, therefor.

In column 9, line 62, delete "can repaired" and insert -- can be repaired --, therefor.

In column 10, line 42-43, delete " $\sigma_i = \dfrac{l-1}{1-p_{block}} \omega$ " and insert -- $\sigma_l = \dfrac{l-1}{1-p_{block}} \omega$ --, therefor.

In column 13, line 16, after "elements" delete "can".

Signed and Sealed this
Eighth Day of January, 2013

David J. Kappos
*Director of the United States Patent and Trademark Office*